US00RE49917E

(19) United States
(12) Reissued Patent
Bazbaz

(10) Patent Number: US RE49,917 E
(45) **Date of Reissued Patent: *Apr. 16, 2024**

(54) SLIPSHEET, DIVIDER SHEET AND METHOD FOR MAKING THE SAME

(71) Applicant: FRESH-PAK LLC, Houston, TX (US)

(72) Inventor: John Bazbaz, Sugar Land, TX (US)

(73) Assignee: Fresh-Pak LLC, Houston, TX (US)

( * ) Notice: This patent is subject to a terminal disclaimer.

(21) Appl. No.: 17/357,516

(22) Filed: Jun. 24, 2021

Related U.S. Patent Documents

Reissue of:
(64) Patent No.: 10,800,558
Issued: Oct. 13, 2020
Appl. No.: 15/890,777
Filed: Feb. 7, 2018

U.S. Applications:
(63) Continuation of application No. 14/167,825, filed on Jan. 29, 2014, now Pat. No. 9,919,490, which is a
(Continued)

(51) Int. Cl.
*B65B 11/00* (2006.01)
*B29D 7/01* (2006.01)
(Continued)

(52) U.S. Cl.
CPC ..... *B65B 11/00* (2013.01); *B29D 7/01* (2013.01); *B32B 3/30* (2013.01); *B32B 27/32* (2013.01); *B65D 19/0002* (2013.01); *B65D 19/44* (2013.01); *B32B 2323/043* (2013.01); *B32B 2323/046* (2013.01); *B32B 2553/00* (2013.01);
(Continued)

(58) Field of Classification Search
CPC ..... B65D 19/44; B65D 19/0002; B32B 3/30; B32B 27/32; B29D 7/01; B65B 11/00
See application file for complete search history.

(56) References Cited

U.S. PATENT DOCUMENTS 2,076,122 A 4/1937 Duryee
2,477,960 A 8/1949 Caldwell
(Continued)

OTHER PUBLICATIONS

U.S. Appl. No. 10/895,203, Advisory Action dated Jun. 2, 2010, 4 pages.
(Continued)

*Primary Examiner* — Carlos N Lopez
(74) *Attorney, Agent, or Firm* — Kilpatrick Townsend & Stockton LLP

(57) ABSTRACT

The present disclosure provides a slipsheet and/or divider sheet and method for making the same, and method for moving and storing containers with use of the slipsheets or divider sheets. The sheets have an imprint or an embossing that provides a raised planar surface. The raised planar surface preferably comprises a plurality of ridges, crowns or crests, which are preferably arranged in a pattern throughout an upper surface of the sheet. To make the sheet, a die can be etched to have protuberances or bumps, and the die is preferably pressed into a sheet of pliable thermoplastic material. The sheet thus made has a plurality of indentations formed by the protuberances or bumps on the die, and the sheet has a planar outer surface comprising a plurality of ridges, crowns and crests between the indentations.

59 Claims, 3 Drawing Sheets

Related U.S. Application Data continuation of application No. 13/460,754, filed on Apr. 30, 2012, now Pat. No. 8,652,612, which is a continuation of application No. 10/895,203, filed on Jul. 20, 2004, now Pat. No. 8,178,186.

(60) Provisional application No. 60/489,820, filed on Jul. 24, 2003.

(51) Int. Cl.

| | |
|---|---|
| ***B32B 3/30*** | (2006.01) |
| ***B32B 27/32*** | (2006.01) |
| ***B65D 19/00*** | (2006.01) |
| ***B65D 19/44*** | (2006.01) |

(52) U.S. Cl.

CPC ..... *B65D 2519/00268* (2013.01); *B65D 2519/00288* (2013.01); *B65D 2519/00318* (2013.01); *B65D 2519/00343* (2013.01); *B65D 2519/0084* (2013.01); *B65D 2571/00043* (2013.01); *Y10S 108/901* (2013.01); *Y10T 428/24355* (2015.01); *Y10T 428/24479* (2015.01); *Y10T 428/2457* (2015.01); *Y10T 428/24612* (2015.01); *Y10T 428/24661* (2015.01); *Y10T 428/24678* (2015.01)

(56) References Cited

U.S. PATENT DOCUMENTS

| | | | | |
|---|---|---|---|---|
| 2,776,451 | A | | 1/1957 | Chavannes |
| 3,457,919 | A | | 7/1969 | Harbard et al. |
| RE29,192 | E | * | 4/1977 | Anderson et al. |
| 4,042,127 | A | | 8/1977 | Brossia |
| 4,228,744 | A | | 10/1980 | Moore |
| 4,259,285 | A | | 3/1981 | Baumgartl et al. |
| 4,339,040 | A | | 7/1982 | Peil et al. |
| 4,376,147 | A | | 3/1983 | Byrne et al. |
| 4,465,729 | A | | 8/1984 | Cancio et al. |
| 4,467,004 | A | | 8/1984 | Liebel |
| 4,507,348 | A | | 3/1985 | Nagata et al. |
| 4,570,546 | A | | 2/1986 | Batelka |
| 4,708,247 | A | | 11/1987 | Liebel |
| 4,947,999 | A | | 8/1990 | Warp |
| 4,991,834 | A | | 2/1991 | Vaux |
| 5,024,799 | A | | 6/1991 | Harp et al. |
| 5,062,370 | A | | 11/1991 | Etlinger |
| 5,111,754 | A | | 5/1992 | Adams |
| 5,202,173 | A | | 4/1993 | Wu et al. |
| 5,226,372 | A | | 7/1993 | Frenkel et al. |
| 5,339,957 | A | | 8/1994 | Carstens et al. |
| 5,385,769 | A | | 1/1995 | Wick |
| 5,472,540 | A | | 12/1995 | Marschke et al. |
| 5,503,517 | A | | 4/1996 | Derby |
| 5,525,030 | A | | 6/1996 | Buchman |
| 5,527,585 | A | | 6/1996 | Needham et al. |
| 5,613,447 | A | | 3/1997 | Trickett |
| 5,687,517 | A | | 11/1997 | Wiercinski et al. |
| 5,897,930 | A | | 4/1999 | Calhoun et al. |
| 5,993,936 | A | | 11/1999 | Gardner |
| 6,059,514 | A | | 5/2000 | Sanchez |
| 6,289,823 | B1 | | 9/2001 | Koefelda et al. |
| 6,490,982 | B1 | | 12/2002 | Trickett |
| 6,509,084 | B2 | | 1/2003 | Sturtevant et al. |
| 6,824,856 | B2 | | 11/2004 | Jones |
| 7,013,814 | B2 | | 3/2006 | Modesitt et al. |
| 7,093,717 | B2 | | 8/2006 | Sakai et al. |
| 8,178,186 | B2 | * | 5/2012 | Bazbaz ..... B32B 3/30 428/156 |
| 8,652,612 | B2 | * | 2/2014 | Bazbaz ..... B32B 3/30 428/156 |
| 9,919,490 | B2 | * | 3/2018 | Bazbaz ..... B32B 3/30 |
| 10,800,558 | B2 | | 10/2020 | Bazbaz |
| 2001/0049007 | A1 | | 12/2001 | Jones |

OTHER PUBLICATIONS

U.S. Appl. No. 10/895,203, Advisory Action dated May 12, 2009, 4 pages.
U.S. Appl. No. 10/895,203, Final Office Action dated Mar. 16, 2010, 11 pages.
U.S. Appl. No. 10/895,203, Final Office Action dated Dec. 8, 2011, 17 pages.
U.S. Appl. No. 10/895,203, Final Office Action dated Mar. 3, 2009, 8 pages.
U.S. Appl. No. 10/895,203, Final Office Action dated May 24, 2007, 8 pages.
U.S. Appl. No. 10/895,203, Non-Final Office Action dated Jul. 6, 2011, 18 pages.
U.S. Appl. No. 10/895,203, Non-Final Office Action dated Aug. 18, 2009, 20 pages.
U.S. Appl. No. 10/895,203, Non-Final Office Action dated Apr. 1, 2008, 7 pages.
U.S. Appl. No. 10/895,203, Non-Final Office Action dated Dec. 14, 2006, 7 pages.
U.S. Appl. No. 10/895,203, Non-Final Office Action dated Sep. 19, 2008, 7 pages.
U.S. Appl. No. 10/895,203, Notice of Allowance dated Jan. 25, 2012, 5 pages.
U.S. Appl. No. 13/460,754, Final Office Action dated Aug. 1, 2013, 6 pages.
U.S. Appl. No. 13/460,754, Non-Final Office Action dated Nov. 20, 2012, 14 pages.
U.S. Appl. No. 13/460,754, Notice of Allowability dated Dec. 18, 2013, 2 pages.
U.S. Appl. No. 13/460,754, Notice of Allowance dated Oct. 9, 2013, 9 pages.
U.S. Appl. No. 14/167,825, Final Office Action dated Jun. 15, 2017, 7 pages.
U.S. Appl. No. 14/167,825, Non-Final Office Action dated Dec. 28, 2016, 7 pages.
U.S. Appl. No. 14/167,825, Notice of Allowance dated Nov. 9, 2017, 6 pages.
U.S. Appl. No. 15/890,777, Advisory Action dated Jun. 10, 2020, 3 pages.
U.S. Appl. No. 15/890,777, Final Office Action dated Apr. 17, 2020, 10 pages.
U.S. Appl. No. 15/890,777, Non-Final Office Action dated Oct. 3, 2019, 10 pages.
U.S. Appl. No. 15/890,777, Non-Final Office Action dated Jul. 7, 2020, 6 pages.
U.S. Appl. No. 15/890,777, Notice of Allowance dated Aug. 24, 2020, 6 pages.

* cited by examiner

FIG. 5
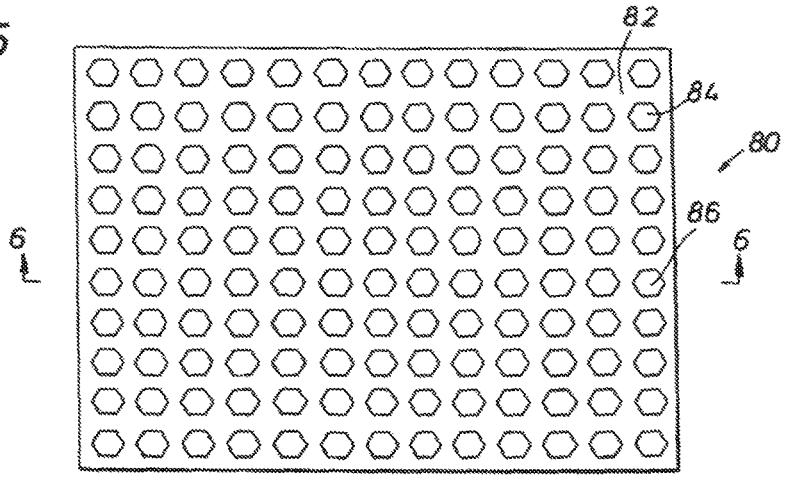
FIG. 6
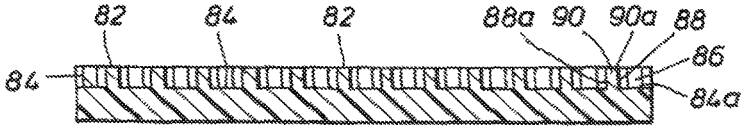
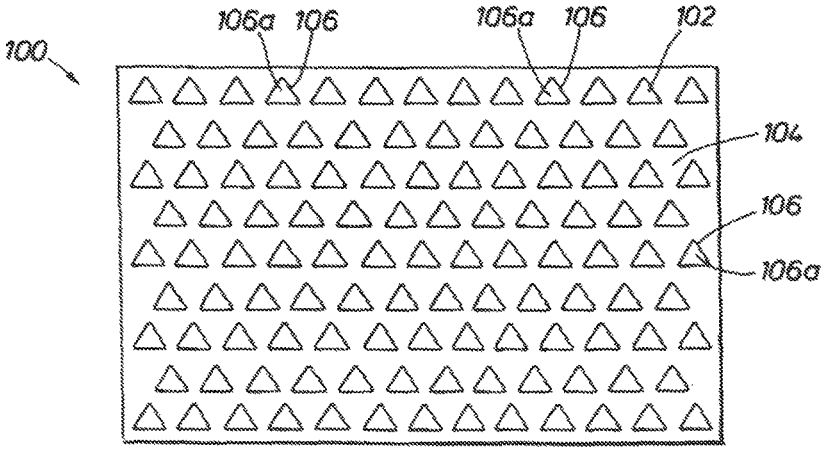
FIG. 7

SLIPSHEET, DIVIDER SHEET AND METHOD FOR MAKING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a reissue of U.S. patent application Ser. No. 15/890,777, filed Feb. 7, 2018, now U.S. Pat. No. 10,800,558, which is* a continuation of and claims benefit of priority to U.S. patent application Ser. No. 14/167,825, filed Jan. 29, 2014, now U.S. Pat. No. 9,919,490, which is a continuation of and claims benefit of priority to U.S. patent application Ser. No. 13/460,754, filed on Apr. 30, 2012, now U.S. Pat. No. 8,652,612, which is a continuation of and claims benefit of priority to U.S. patent application Ser. No. 10/895,203, filed Jul. 20, 2004, now U.S. Pat. No. 8,178,186, which claims benefit of priority to U.S. Provisional Pat. Application Ser. No. 60/489,820, filed Jul. 24, 2003, each of which is hereby incorporated herein by reference.

FIELD OF THE INVENTION

This invention pertains to the field of transporting goods as a load on a pallet, and, more particularly, to a slipsheet or divider sheet on which goods can be placed for transport.

DESCRIPTION OF THE RELATED ART

Goods, typically packaged in cartons or boxes, have for some time been placed on a pallet, which can be picked up by a fork-lift vehicle and moved on and off of a truck for transport from one place to another, about a warehouse for storage, and within a plant or factory where the goods are made or used. Wooden pallets are frequently used, which comprises a top platform for receiving and supporting the goods, a bottom platform that can rest on a floor or support surface, and rails or spacers separating the top and bottom platforms arranged in a manner so that the forks of a fork-lift vehicle can be received in the pallet. These wooden pallets are relatively expensive to purchase and require a great deal of room when transporting goods in a truck. Wooden pallets frequently require transport to a place where needed, and transporting empty wooden pallets is relatively expensive.

Cardboard and plastic slipsheets were developed as a space-saving device for supporting a load of goods. Slipsheets are much less expensive than wooden pallets and comprise a thin sheet of material that otherwise has the approximate dimensions of a typical wooden pallet. U.S. Patent No. Re. 29,192, issued to Anderson et al., describes a slipsheet and a fork-lift and push-pull type truck, which is a fork-lift vehicle with an apparatus for handling a slipsheet, which Anderson et al. refer to as a slip pallet. Anderson et al. describes a slip pallet formed as a square or rectangular sheet of a synthetic resin of selected types of polyolefin. The sheet is proportioned to fit upon the forks or platen of a lift truck. The slipsheet has tabs at each edge, which can be gripped when the platen is thrust underneath the sheet, or the sheet can be pulled upon or pushed off from the platen by a push-pull apparatus used to modify a standard fork-lift vehicle. Anderson et al. describe their slip pallet as ordinarily carrying loads of boxes formed as interlocking layers, and an important feature of their slip pallet resides in providing a sheet having a greater coefficient of friction at the upper surface whereon the boxes are placed than at the undersurface, which is contacted by the platen.

The slip pallet of Anderson et al requires the upper surface of the slip pallet be textured or otherwise modified to increase the frictional resistance between the upper surface and the box load upon it. (Column 7, lines 39-42.) Anderson et al. found that the frictional resistance between the undersurface of the pallet and the platen could be minimized if the plastic sheet were roughened to a slight degree. (Column 8, lines 7-10.) Anderson et al. state that the textured surface of the plastic slip pallet can best be obtained when the web from which the pallets are formed is being manufactured. A standard manufacturing procedure for producing a web is by extruding hot thermoplastic material into the web form and finishing the web by moving it through sizing and cooling rollers. (Column 8, lines 13-19.) Anderson et al. suggest that their slip pallet can be made by roughening one of the finishing and cooling rollers about which the sheet moves, and a suitable method for roughening or texturing the finishing and cooling roller is by sandblasting the surface of the roller or by using other modes of roughening. (See column 8, lines 26-33.) Anderson et al. wanted to assure a comparatively high coefficient of friction between the surface of the plastic pallet and the paper material of an ordinary cardboard box and stated that a depth of approximately 60 micro-inches of surface roughness is satisfactory to achieve the high friction that they desired.

SUMMARY OF THE INVENTION

The present invention comprises a slipsheet and/or divider sheet with an imprinted surface. The imprinted surface has a projecting area comprising an outer support surface and an inner surface. The imprinted surface is planar and preferably comprises a planar web-like or net-like structure or a plurality of discrete surfaces that lie in a plane for supporting goods placed on the support surface.

One embodiment of the present invention comprises a sheet of thermoplastic material having opposing planar surfaces with one of the surfaces having an embedded pattern. The pattern preferably comprises a first row of indentations spaced apart and a second row of indentations spaced apart, and the indentations of the second row are aligned between the indentations of the first row. The rows of indentations are preferably repeated to form the embedded pattern.

Another embodiment of the present invention comprises a method for forming a slipsheet or divider sheet, preferably by forming a sheet of plastic material having a planar surface with a certain area and reducing the area by forming indentations into the sheet of plastic material through the planar surface. An undented portion remains undisturbed, which provides a planar support surface. The method preferably further includes providing a die having protuberances, where the die is used to form indentations by the protuberances in the sheet of plastic material. The protuberances on the die are preferably arranged in a pattern to imprint a pattern in the sheet of plastic material. The die is preferably etched and/or engraved to have indentations of a uniform depth so that a raised surface will be formed on a sheet of plastic material when the die is pressed into the plastic material while it is pliable so as to leave an embossed, planar support surface on the sheet of plastic material. In one embodiment a roller having indentations etched to a uniform depth provides a satisfactory die that can be placed between two smooth rollers.

BRIEF DESCRIPTION OF THE DRAWINGS

FIG. 5 is a plan view of surface of a slipsheet or a divider sheet according to the present invention.

FIG. 6 is a cross-section as seen along the lines 6-6 in FIG. 5.

FIG. 7 is a plan view of a surface of a slipsheet or divider sheet according to the present invention.

DETAILED DESCRIPTION OF THE INVENTION

The present invention provides a slipsheet or divider sheet having a support surface for supporting goods, such as boxes, packages, or empty containers before filling in a filling operation at a plant or factory. The support surface has a low coefficient of friction provided by having a raised, partial surface. The slipsheet/divider sheet has a full projecting surface comprising the support surface, which is raised, and a recessed surface. The projecting surface is the combined set of surfaces seen in a plan view. By having a raised support surface, there is less engagement between the support surface of the slipsheet or divider sheet and the goods placed on the slipsheet or divider sheet. The raised support surface preferably extends over a majority of the projecting area and provides a planar surface for supporting goods.

Figure 1:
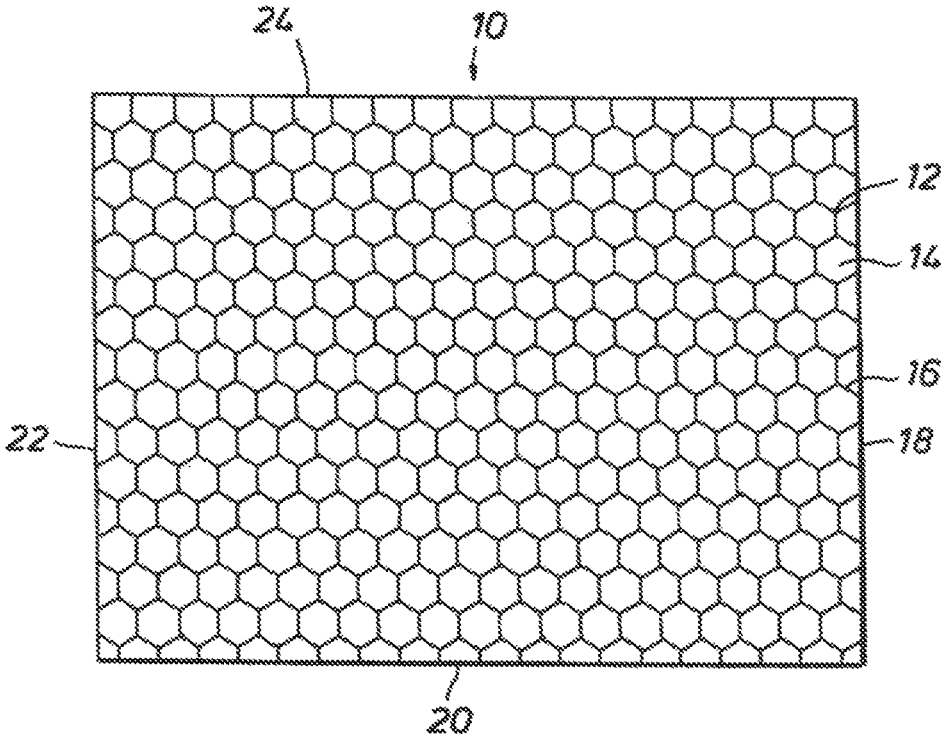
FIG. 1 is a plan view of an imprinted surface on a slipsheet or divider sheet according to the present invention.

With reference to FIG. 1, a portion of a slipsheet or divider sheet 10 is shown in plan view according to the present invention. The plan view is of a small section showing an actual embodiment of the present invention. The dimensions shown in FIG. 1 are for a piece of material about 3 inches by 4 inches out of a sheet of material that may be approximately 3 feet by 4 feet or any suitable dimension for a slipsheet or divider sheet. The terms slipsheet and divider sheet are used interchangeably herein as the present invention includes each. A slipsheet may be used for supporting, as a pallet, a load of finished goods, while a divider sheet may be used for dividing layers of empty containers before being filled with a product. A slipsheet is typically made from high density polyethylene, which can be a recycled material. A divider sheet is typically made from polypropylene, which tends to be stiffer than high density polyethylene typically used for making a slipsheet. However, other materials of construction can be used for making a slipsheet and/or divider sheet according to the present invention, such as other types of polyolefins, co-polymers, cardboard, non-thermoplastic polymeric materials, and wood-based products.

Slipsheet 10 has a support surface 12 and a recessed surface 14. Support surface 12 comprises ridges 16 formed in a continuous pattern between edges 18, 20, 22 and 24. Looking at the plan view in FIG. 1 of slipsheet 10, one sees a projected area comprising raised support surface 12 and recessed surface 14. Raised support surface 12 is comprised of ridges 16.

Figure 2:
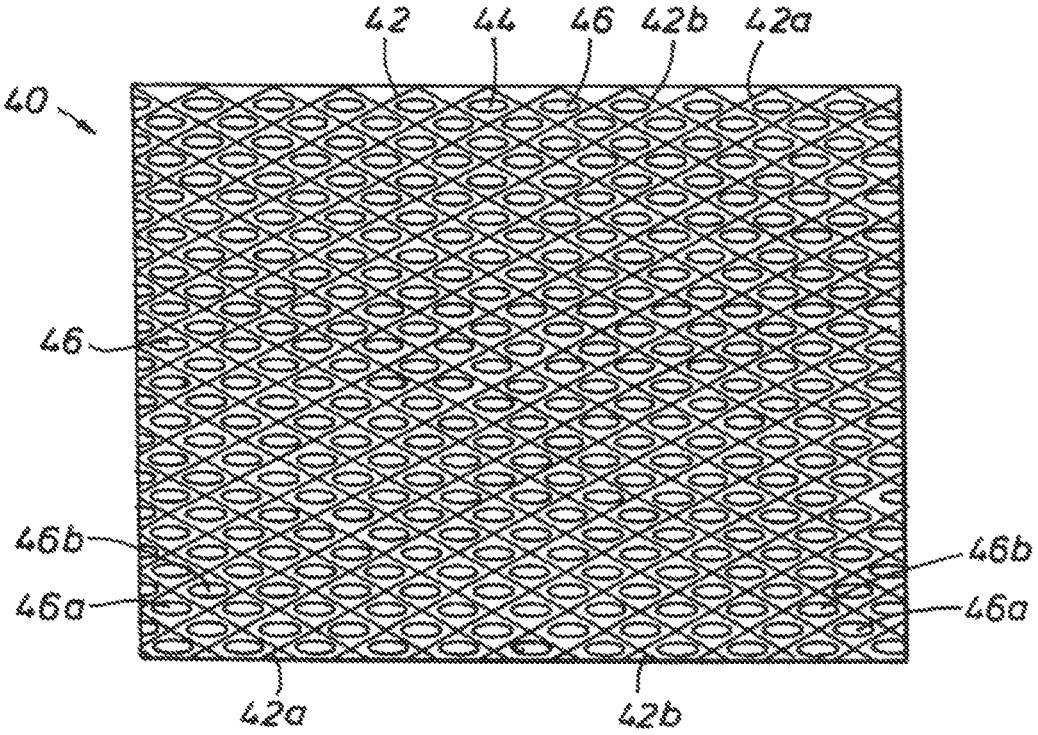
FIG. 2 is a plan view of a surface on a slipsheet or divider sheet according to the present invention.

Turning to FIG. 2, a portion of a slipsheet or divider sheet 40 is shown in plan view according to the present invention. Slipsheet 40 has a total projected area comprising a raised planar support surface 42 and a recessed surface 44. Support surface 42 comprises a first set of ridges 42a running from the lower left to the upper right and a second set of ridges 42b running from the upper left to the lower right. Lines 42a and 42b intersect to form a diamond-shaped pattern. Ridges 42a and 42b extend upwardly from recessed surface 44 to an essentially uniform height to provide support surface 42 with a planar surface. In this embodiment, recessed surface 44 comprises a plurality of oval-shaped indentations 46. Indentations 46 can have any of a number of different shapes such as oval, circle, triangle, square, rectangle, diamond, parallelogram, and polygon, as well as three-dimensional analogs of these two-dimensional shapes. Indentations 46 comprise a first row of indentations 46a spaced apart essentially equally. A second row of indentations 46b is adjacent to first row of indentations of 46a. Indentations 46b are spaced essentially equally apart and are aligned in the spaces between indentations 46a. The first and second rows of indentations 46a and 46b, respectively, are repeated to form a pattern, which comprises recessed surface 44. Recessed surface 44 includes a bottommost surface defined by each indentation 46 and a sloped surface rising from the bottommost surface to the support surface 42, which is an uppermost surface.

Support surface 42, which comprises ridges 42a and 42b surface for supporting boxes, cartons, or empty containers before the empty containers are filled with products. Support surface 42 provides less contact area as compared to a slipsheet having a smooth continuous surface. By having this reduced surface area, a lower coefficient of friction is provided between slipsheet 40 and items placed on slipsheet 40 as compared to the coefficient of friction between those items and a slipsheet having a smooth continuous surface. Alternatively, slipsheet 40 can be turned over so that support surface 42 is in contact with the platen of a fork-lift truck. An imprinted surface can also be formed on an opposing side of slipsheet 40 so that both sides have an imprinted surface.

While slipsheet 40 in FIG. 2 could represent a scaled drawing of one surface of a slipsheet or divider sheet, the drawing in FIG. 2 represents in this embodiment a small portion of a slipsheet with dimensions of about 3 inches by about 4 inches, while the full-sized slipsheet may have dimensions of about 3 feet by about 4 feet. The dimensions can be of any size desired. Slipsheet 40 is one embodiment of the present invention showing one possible actual size for the indentations.

A slipsheet or divider sheet according to the present invention can be made by etching and/or engraving a sizing or rolling die to have protuberances and a recessed surface. A sheet or web of thermoplastic material, such as polyethylene, recycled polyethylene, polypropylene, co-polymers of monomers for such polymers or other polyolefins, is passed over, under or around the roller engraved to have the protuberances and recessed surfaces. In one embodiment three rollers are arranged one above another with an engraved roller in the middle. A continuous sheet of plastic passes between the rollers from top to bottom. The rollers press the sheet to a desired thickness. While the thermoplastic material is still warm and pliable, the protuberances on the engraved roller form indentations in the sheet of plastic, while the recessed surfaces on the engraved roller form raised surfaces on the sheet of thermoplastic material. Alternatively, the protuberances on the roller may dent the surface of an otherwise smooth sheet of material while the recessed portion of the roller has no contact with the sheet. The sheet of thermoplastic material can be cut to a desired length, while the width is defined by the width of the equipment processing the thermoplastic material to form the sheet. The sheet thus formed has a support surface formed by the recessed surface on the roller and a recessed surface formed by the protuberances on the roller.

A pattern can be etched and/or engraved in the roller, and a negative image of the pattern can be formed in the sheet of thermoplastic material to make a slipsheet or divider sheet according to the present invention. The recesses engraved in the roller are preferably at a uniform depth so as to provide a support surface on the slipsheet or divider sheet that is a planar surface. In this manner, a slipsheet or divider sheet can be made having a coefficient of friction of a desired value for a particular application. The size of the indentations can be determined as appropriate for the particular application for which the slipsheet is designed.

An etched roller can be made by grinding a roller to a desired dimension; coating the roller with a photosensitive material; preparing a sheet to wrap around the roller that is a negative of the desired image to be placed on the roller; wrapping the negative around the roller; exposing the roller and negative to a high intensity ultraviolet light; removing the negative; etching the roller; and acid washing the roller. A flash chrome plating can be applied to the roller for improving release of a plastic sheet from the roller, for improving corrosion resistance, and for providing a hardened surface. An engraved or etched roller satisfactory for practicing the present invention can be obtained from a company operating under the service mark Mold-Tech® in Youngstown, Ohio.

A plate can be used as an alternative to the roller, where the plate is used to stamp a sheet of thermoplastic material, while the material is still warm and pliable. Other methods can be used to form recesses in the surface of a slipsheet, such as by etching or carving, but it is believed to be more cost effective to imprint the sheet while it is still warm and pliable during its initial manufacture. These other methods may be more applicable if a non-thermoplastic polymeric material, a paper or wood-based material or a metal material is used.

Figure 3:
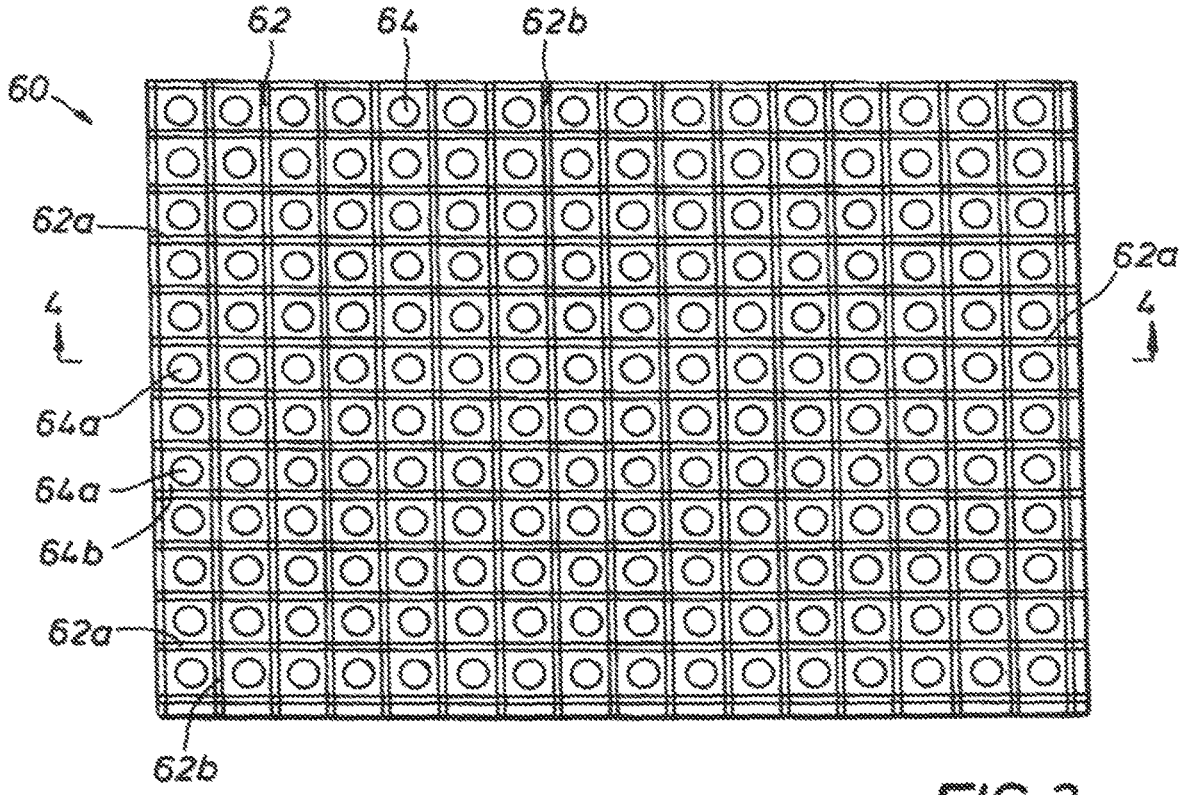
FIG. 3 is a plan view of a surface of a slipsheet or divider sheet according to the present invention.

Turning now to FIG. 3, a slipsheet or divider sheet 60 is illustrated in plan view. Slipsheet 60 has a total projecting area comprising a support surface 62 and a recessed surface 64. Support surface 62 comprises ridge rows 62a and ridge columns 62b. Recessed surface 64 comprises indented surfaces 64a and transition or intermediate surfaces 64b. Transition surface 64b provides a transition from a lowermost surface, which is indented surface 64a, and an uppermost surface, which is support surface 62 comprising rows and columns 62a and 62b, respectively.

Figure 4:
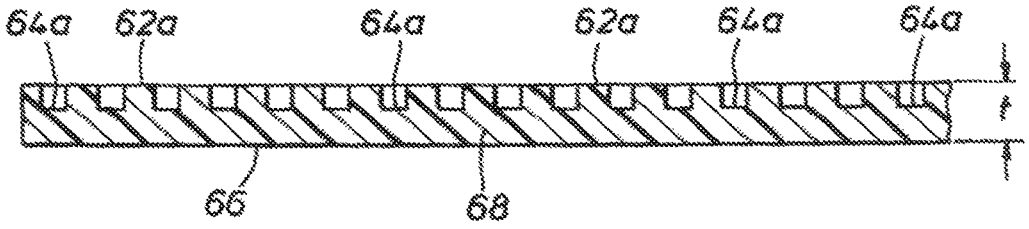
FIG. 4 is a cross-section as seen along the lines 4-4 in FIG. 3.

FIG. 4 is a cross-section of slipsheet 60 in FIG. 3 as seen along the lines 4-4. Slipsheet 60 in FIG. 3 has been cut through recessed surface 64, showing lowermost indented surface 64a. For simplicity, no transition surface 64b is shown in FIG. 4, although such surfaces generally exist. Recessed surface 64 is made by cylindrical indentations, which would be made by cylindrical protuberances on a die. Slipsheet 60 has a lower surface 66 and a base 68, which is a continuous sheet of material. An imprinted pattern is formed in base 68. Slipsheet 60 has a thickness t, which can be of any suitable measure, but is typically around 1/16th of an inch. The thickness t may typically range between about one millimeter and about five millimeters, but can be of any desirable thickness.

With reference to FIG. 5, a slipsheet or divider sheet 80 is shown in plan view and has a support surface 82 and a recessed surface 84. FIG. 6 is a cross-section of slipsheet 80 in FIG. 5 as seen along the line 6-6. Slipsheet 80 is made by a die having hexagon-shaped protuberances and a uniformally flat recessed surface, which forms support surface 82 during manufacture of slipsheet 80. An indentation 86 is defined by a recessed surface 84a in row 88.

As can be seen in FIG. 6, row 88 and an adjacent row 88a define a vertical structure 90, such as a ridge, crown or crest. Vertical support structure 90 has an uppermost surface 90a, which comprises a portion of support surface 82. While surfaces 90a and 82 can be made by a recessed surface in a die, these surfaces can be made as a sheet is made on a manufacturing line and be left undisturbed as dents are made in the sheet.

FIG. 7 is a plan view of another embodiment of the present invention, a slipsheet 100 having a support surface 102 and a recessed surface 104. Triangular-shaped protuberances 106 rise above recessed surface 104. Each of the triangular-shaped protuberances 106 has an upper surface 106a. Each of the upper surfaces 106a combine to form support surface 102. Slipsheet 100 can be formed using a die having triangular-shaped recesses to form protuberances 106. Each of the recesses can be engraved to a uniform depth to provide the planar support surface 102. In the embodiment of the invention illustrated by slipsheet 100, a plurality of discrete flat surfaces 106a comprise planar support surface 102. Each upper surface 106a of each protuberance 106 works in a cooperative fashion to provide planar support surface 102. However, the embodiments of the invention where indentations are made, leaving ridges, crowns or crests cooperating to provide a planar support surface, are preferred because it is believed that in making slipsheet 100, the plastic material may become stuck in recesses in the die that would be used to make protuberances 106, resulting in a less than ideal support surface 102.

An unexpected benefit of imprinting a slipsheet or divider sheet is that the slipsheet or divider sheet is made stronger by the imprinting or embossing process. Without being held to theory, it is believed that when a sheet of thermoplastic material is processed through machines as a continuous web, the polymer molecules in the sheet tend to align in the machine direction. With the polymer molecules thus aligned, there is little bonding between parallel molecular chains, which results in a lower tear strength in the cross-machine direction than in the machine direction. It is believed that the aligned molecules in the machine direction are more strongly bonded together than adjacent, essentially parallel molecular chains along the cross-machine direction.

By imprinting or embossing a slipsheet or divider sheet while the material is still warm and pliable, it is believed that adjacent, parallel chains of molecules are moved out of parallel alignment, which allows additional molecular bonding in the cross-machine direction. This additional bonding in the cross-machine direction due to physical movement of the polymer chains due to the imprinting or embossing process is believed to provide additional molecular bonding in the cross-machine direction because the otherwise aligned, parallel configuration of the polymer chains is disturbed. Some of the polymer chains (and portions of polymer chains) are believed to be moved into a cross-machine alignment so that not essentially all polymer chains are aligned along the machine direction.

A slipsheet or divider sheet made as described above with an imprinted or embossed pattern has a greater tear strength in the cross-machine direction than such a sheet made using a roller that has been sandblasted. This is an unexpected benefit relative to the sheets made using a sandblasted roller.

In summary, a slipsheet or divider sheet according to the present invention can be described in a number of ways. The slipsheet/divider sheet typically includes a sheet of thermoplastic material, although other materials, such as cardboard, can be used. The sheet may have opposing planar surfaces and preferably has at least one planar surface that is imprinted or embossed. As a divider sheet, the imprinted surface has a support surface for supporting goods, such as boxes, cartons or containers. As a slipsheet, the imprinted pattern can be turned downward to provide a low-friction surface for the platen on a forklift, while the upper surface can be smooth to provide a relatively high-friction surface for supporting goods. Both of the opposing planar surfaces can be imprinted, particularly for use as a divider sheet.

The imprinted surface may comprise the upper surface of a plurality of protuberances projecting from the slipsheet/divider sheet. More typically, the support surface comprises the upper surface of a plurality of ridges, crowns and crests. The ridges may be arranged in rows and columns, but any suitable configuration that provides an imprinted surface is satisfactory. Generally, the ridge, crown and crest structures cover a majority of the projecting surface of at least one side of a sheet of material and can be on both sides.

In one embodiment, ridges are arranged in parallel rows, and the parallel rows intersect each other to form a pattern. It may be a diamond-shaped pattern, and alternatively, a square-shaped or rectangular-shaped pattern may be suitable. Indentations are preferably formed between rows and columns of ridges. The ridges may be oriented at a 90-degree angle from a row to a column, but the angle can be varied so that rows and columns at right angles are not formed. In a preferred embodiment, the ridges are arranged to form a diamond-shaped pattern, but a pattern is not necessary. A uniform height or elevation of ridges, crowns and crests is desired to provide a planar support surface. One advantage of the present invention is that the ridges, crowns and crests provide some rigidity to the sheet as compared to a sheet made using a sandblasted roller. The ridges, crowns and crests appear to provide strengthening like corrugation does for a sheet of metal.

The present invention includes a method for forming a slipsheet or divider sheet using a sheet of plastic material formed having a planar surface with an area of x square units, reducing the planar surface to x minus y square units by forming indentations through the planar surface, and leaving a planar support surface. In one aspect, a slipsheet can be formed by pressing a sheet of plastic material with a device, such as a roller or press plate, having protuberances. The protuberances form indentations in the sheet and leave a plurality of raised surfaces that form a support surface. The device may be engraved to have a pattern of protuberances and recessed surfaces, where the recessed surface on the device may form a raised surface on the sheet of plastic material. A sheet of plastic material is imprinted or embossed by pressing the device on the sheet. While one side of the sheet has an imprinted or embossed surface to provide a raised support surface, the opposing side of the sheet is typically smooth, but may have an imprinted or embossed surface of any desired type. The imprinted or embossed surface provides a support surface, and the support surface may comprise a continuous web, grid-like or net-shaped structure or discrete and discontinuous surfaces. The coefficient of friction on the support surface is preferably less than the coefficient of friction on an opposing surface, which may typically be an underside of the slipsheet or divider sheet.

One application for the present invention is as a divider sheet, particularly for holding empty containers, such as cans or bottles, for feeding the containers into an apparatus for filling or loading the containers. Divider sheets may be made using high density polyethylene (HDPE), polypropylene or any suitable material that, when imprinted, provides a relatively low coefficient of friction. An advantage of the low coefficient of friction between the container and the divider sheet is that the container can be easily slid off of the divider sheet onto an assembly line for filling or loading the container. The filled or loaded container can easily be slid back onto the divider sheet. For suitable containers, vertical layers of the containers can be separated by divider sheets made according to the present invention. A palletized load can be made by alternating layers of containers and divider sheets, wrapping the stack in a shrink-wrap material, banding the load together, or otherwise providing a unitary package that can be transported by a forklift. The unitary package is preferably placed on a slipsheet according to the present invention, but may be placed on a conventional pallet. The forklift handling the load on a divider sheet typically has a push-pull apparatus for handling divider sheets.

The slipsheet of the present invention can be used as a pallet. A method of using a slipsheet/divider sheet according to the present invention is to place the imprinted surface upwards for supporting a load of empty containers as a divider sheet and to use a sheet with the imprinted surface down as a slipsheet. With the imprinted surface down, a fork-lift truck can more easily pull a load onto the platen or forks of the fork-lift truck because there is less friction between the platen/forks and the slipsheet when the slipsheet has an imprinted surface according to the present invention. The slipsheet can have an imprinted surface on a downward-facing surface and a smooth surface on an upward-facing surface. The downward-facing imprinted surface presents a lower coefficient of friction between the sheet and platen of a fork-lift vehicle than would be present between a smooth surface and the platen. A smooth, upward-facing surface provides a higher coefficient of friction than an imprinted surface, and thus more gripping capability or holding capability for the slipsheet to hold a load of goods, such as boxes, on the upward-facing support surface of the slipsheet. Thus, the slipsheet/divider sheet of the present invention can be flipped over depending on its application as a slipsheet or as a divider sheet.

Both the slipsheet and the divider sheet can be provided with an upturned tab, which can be more easily grabbed by a push-pull type fork-lift vehicle. The sheet can be scored parallel to an edge in a manner to provide an upturned tab of an appropriate dimension. Tabs on multiple edges can be provided if desired.

The slipsheet described above can be made using HDPE, including some recycled HDPE. In one embodiment of a slipsheet, a layer of linear low density polyethylene (LLDPE) is co-extruded on top of a layer of HDPE to provide an anti-slip property. The HDPE layer contacts an etched roller that provides an imprinted surface while the LLDPE layer contacts rollers with smooth surfaces. The imprinted HDPE layer is placed downward to provide a low-friction surface for the platen, and the relatively softer and smoother LLDPE surface is placed upward to provide a relatively high-friction surface for goods placed on the slipsheet.

There are several ways in which HDPE and LLDPE can be co-extruded. Separate sheet extrusion dies can be placed one above the other with LLDPE extruded and fed to the upper one and HDPE extruded and fed to the lower one. A small roller brings the LLDPE sheet parallel and adjacent to the HDPE layer. Both layers are then passed through three rollers arranged horizontally one above another, where the center roller has been etched to have recesses separated by ridges of the original surface. The lower and upper rollers are smooth. The LLDPE layer contacts the smooth rollers while the HDPE layer contacts the etched roller. The layer of LLDPE is bonded to the layer of HDPE as the two layers are squeezed together while passing between adjacent rollers. The rollers are spaced sufficiently from the HDPE sheet extrusion die to allow for the LLDPE layer to be placed adjacent to the HDPE layer. For a single sheet from one sheet extrusion die, the rollers would typically be placed immediately adjacent to the sheet extrusion die, but in this embodiment the rollers are instead spaced apart from the extrusion die.

A second co-extrusion alternative is to feed the LLDPE to a co-extrusion box in a line between the HDPE extruder and a single sheet extrusion die. A third co-extrusion alternative is to feed the LLDPE immediately upstream of a single sheet extrusion die, which also receives the extruded HDPE. In each alternative a two-layer sheet of thermoplastic material is formed, where one layer comprises primarily LLDPE and the other layer comprises primarily HDPE. After the extrusion and imprinting operations, the continuous sheet can be passed forward for printing and cutting operations. The continuous sheet can be cut into pallet-sized lengths and stacked and banded for shipment to customers.

The foregoing disclosure and description of the preferred and various embodiments of the invention is illustrative only. Some alternatives for the various features have been expressly disclosed, but other variations and alternatives can be used. Various changes may be made in the design imprinted or embossed on a sheet. The material of construction can be altered as can be the thickness of the material and depth of the imprint. The process for making the slipsheet or divider sheet can be altered in various ways. Uses and applications for the slipsheet and divider sheet may encompass more than the specific embodiments disclosed herein. The scope of the invention should be determined by the following claims and not by the specific embodiments used to illustrate the invention.

What is claimed is:

1. A method for making a slipsheet, comprising the steps of:

extruding a first sheet comprising high density polyethylene;

extruding a second sheet comprising linear low density polyethylene; and passing the first and second sheets through a plurality of rollers, thereby forming a single unitary sheet having a top surface and a bottom surface, wherein one of the plurality of rollers comprises an indented surface having a plurality of indentations, and the indented surface of the roller is adapted to impart a raised surface on the top surface of the single unitary sheet, and wherein the indentations have a size adapted to provide a desired coefficient of friction of the raised surface that is less than a coefficient of friction of the bottom surface of the single unitary sheet.

2. The method of claim 1, wherein the step of extruding the first sheet and the step of extruding the second sheet are performed by co-extrusion.

3. The method of claim 2, wherein each of the rollers within the plurality of rollers are arranged vertically relative to the other rollers.

4. The method of claim 2, wherein each of the rollers within the plurality of rollers are arranged horizontally relative to the other rollers.

5. The method of claim 2, wherein a first sheet extrusion die and a second extrusion die are placed one above the other with linear low density polyethylene extruded and fed to an upper die and high density polyethylene fed to a lower die.

6. The method of claim 2, wherein the plurality of rollers comprises a first roller which has a smooth surface, a second roller which has a surface comprising a plurality of protuberances and a plurality of recesses, and a third roller which has a smooth surface, and wherein the second roller is located between the first roller and the third roller.

7. The method of claim 6, wherein the plurality of rollers press the first and second sheets together and form a single unitary sheet, the plurality of recesses on the surface of the second roller form raised surfaces on the top surface of the single unitary sheet, and the plurality of protuberances on the surface of the second roller form recessed surfaces on the top surface of the single unitary sheet.

8. The method of claim 2, wherein the linear low density polyethylene sheet is fed to a co-extrusion box in a line between a HDPE extruder and a single sheet extrusion die.

9. The method of claim 2, wherein the linear low density polyethylene sheet is fed immediately upstream of a single sheet extrusion die, which also receives a high density polyethylene sheet that has been extruded.

10. The method of claim 6, wherein the plurality of rollers are arranged vertically with the second roller below the first roller and the third roller below the second roller.

11. The method of claim 6, wherein the plurality of rollers are arranged horizontally with the second roller below the first roller and the third roller below the second roller.

12. The method of claim 7, wherein the bottom surface comprises a recessed surface and a grid of ridges, wherein the recessed surface comprises a plurality of indentations arranged in a pattern.

13. The method of claim 12, wherein the raised surface is relatively smooth in comparison to the bottom surface.

14. A method for making a slipsheet, comprising:

co-extruding a unitary sheet of plastic comprising a first sheet comprising high density polyethylene and a second sheet comprising low density polyethylene, wherein the unitary sheet has a top surface and an opposing bottom surface; and passing the unitary sheet of plastic through a plurality of rollers, wherein the plurality of rollers press the first sheet and the second sheet together, wherein at least one of the plurality of rollers comprises an indented surface adapted to impart a raised surface on the top surface of the unitary sheet and further wherein the indented surface is adapted to provide a desired coefficient of friction value of the raised surface that is less than a coefficient of friction of the bottom surface the unitary sheet.

15. The method according to claim 14 further comprising the step of providing a plurality of extrusion dies arranged vertically with respect to each other with low density polyethylene fed to an upper one of the plurality of extrusion dies and high density polyethylene fed to a lower one of the plurality of extrusion dies.

16. The method according to claim 14 wherein the plurality of rollers comprises a first roller having a smooth surface, a second roller having a plurality of protuberances and a plurality of recesses, and a third roller having a smooth surface.

17. The method according to claim 16 wherein the second roller is located between the first roller and the third roller.

18. The method according to claim 14 wherein the recessed surface is smoother than the bottom surface.

19. The method according to claim 18 wherein the bottom surface comprises a plurality of ridges and a plurality of indentations.

20. A slipsheet made according to the method of claim 1.

21. A slipsheet made according to the method of claim 14.

*22. A slipsheet or divider sheet comprising a sheet of material adapted to support a load, wherein the sheet of material comprises:*

*a thermoplastic material;*

*four edges defining a perimeter of the sheet of material, wherein the four edges comprise a first edge, a second edge, a third edge, and a fourth edge;*

*a first surface and a second surface, wherein:*

*the first surface has a first coefficient of friction and the second surface has a second coefficient of friction, wherein the first coefficient of friction is lower than the second coefficient of friction;*

*the first surface is opposing the second surface; and*

*the first surface comprises a support surface, wherein the support surface is:*

*adapted to support goods, boxes, packages, or containers; and comprises a recessed surface having an imprinted pattern of indentations and a raised surface having a pattern of raised surfaces.*

*23. The slipsheet or divider sheet according to claim 22, wherein the pattern of raised surfaces comprises a plurality of protuberances projecting from at least a portion of the first surface of the sheet of material, wherein the plurality of protuberances are arranged in a series of rows.*

*24. The slipsheet or divider sheet according to claim 23, wherein the series of rows forming the plurality of protuberances extend from the first edge to the second edge along at least a portion of the first surface at an angle that is not orthogonal to the first edge or the second edge.*

*25. The slipsheet or divider sheet according to claim 24, wherein:*

*the first edge and the third edge are parallel; and*

*the second edge and the fourth edge are parallel.*

*26. The slipsheet or divider sheet according to claim 23, wherein the imprinted pattern of indentations comprises grooves extending in between the rows forming the plurality of protuberances.*

*27. The slipsheet or divider sheet according to claim 22, wherein the recessed surface further comprises a transition or intermediate surface located between a lowermost surface and an uppermost surface.*

*28. The slipsheet or divider sheet to claim 22, wherein the raised surface comprises a majority of the first surface.*

*29. The slipsheet or divider sheet according to claim 22, wherein the pattern of raised surfaces provides rigidity to the first surface.*

*30. The slipsheet or divider sheet according to claim 22, wherein the sheet of material comprises a first layer and a second layer, wherein at least one of the first layer and the second layer comprise high density polyethylene.*

*31. The slipsheet or divider sheet according to claim 30, wherein the at least one of the first layer and the second layer comprises high density polyethylene and the other comprises linear low density polyethylene.*

*32. The slipsheet or divider sheet according to claim 22, wherein the divider sheet has a thickness of from 1 millimeter to 5 millimeters.*

*33. The slipsheet or divider sheet according to claim 22, wherein the raised surface comprises a plurality of crowns.*

*34. The slipsheet or divider sheet according to claim 22, wherein the raised surface comprises a plurality of crests.*

*35. The slipsheet or divider sheet according to claim 33, wherein the plurality of crowns defines an outermost surface of the first surface.*

*36. The slipsheet or divider sheet according to claim 34, wherein the plurality of crests defines an outermost surface of the first surface.*

*37. The slipsheet or divider sheet according to claim 22, wherein the sheet of material has a first tear strength in a first direction and a second tear strength in a second direction, and the first tear strength is greater than the second tear strength.*

*38. The slipsheet or divider sheet according to claim 22, wherein the support surface comprises a grid-like or net-shaped structure or discrete and discontinuous structures.*

*39. The slipsheet or divider sheet according to claim 22, wherein the recessed surface comprises a grid-like or net-shaped structure or discrete and discontinuous structures.*

*40. The slipsheet or divider sheet according to claim 22, wherein the raised surface comprises a grid-like or net-shaped structure or discrete and discontinuous structures.*

*41. The slipsheet or divider sheet according to claim 22, wherein the sheet of material is made from recyclable material.*

*42. The slipsheet or divider sheet according to claim 22, wherein the sheet of material is recyclable.*

*43. The slipsheet or divider sheet according to claim 22, wherein the sheet of material is rectangular.*

*44. A slipsheet or divider sheet comprising a sheet of material adapted to support a load, wherein the sheet of material comprises:*

*a thermoplastic material;*

*four edges defining a perimeter of the sheet of material, wherein the four edges comprise a first edge, a second edge, a third edge, and a fourth edge; and*

*a first surface and a second surface, wherein:*

*the first surface has a first coefficient of friction and the second surface has a second coefficient of friction, wherein the first coefficient of friction is lower than the second coefficient of friction;*

*the first surface is opposing the second surface; and*

*the first surface comprises a support surface;*

*wherein the support surface comprises a pattern comprised of a plurality of rows of indentations and a plurality of rows of raised surfaces, wherein: the plurality of rows of indentations extend in between the plurality of rows of raised surfaces; and the plurality of rows of raised surfaces extend from the first edge to the second edge along at least a portion of the first surface at an angle that is not orthogonal to the first edge or the second edge.*

*45. The slipsheet or divider sheet according to claim 44, wherein the raised surfaces comprise a plurality of protuberances projecting from at least a portion of the first surface of the sheet of material.*

*46. The slipsheet or divider sheet according to claim 45, wherein the plurality of rows of indentations comprise grooves extending in between the plurality of protuberances.*

*47. The slipsheet or divider sheet according to claim 46, wherein the plurality of rows of indentations comprise a grid-like or net-shaped structure.*

*48. The slipsheet or divider sheet according to claim 46, wherein:*

*the first edge and the third edge are parallel; and*

*the second edge and the fourth edge are parallel.*

*49. The slipsheet or divider sheet according to claim 47, wherein the plurality of protuberances defines an outermost surface of the first surface.*

*50. The slipsheet or divider sheet according to claim 45, wherein the raised surfaces comprise a majority of the first surface.*

*51. The slipsheet or divider sheet according to claim 44, wherein the plurality of rows of raised surfaces provides rigidity to the first surface.*

*52. The slipsheet or divider sheet according to claim 44, wherein the sheet of material has a first tear strength in a first direction and a second tear strength in a second direction, and the first tear strength is greater than the second tear strength.*

*53. The slipsheet or divider sheet according to claim 44, wherein the slipsheet comprises a first layer and a second layer, wherein at least one of the first layer and the second layer comprise high density polyethylene.*

*54. The slipsheet or divider sheet according to claim 53, wherein the at least one of the first layer and the second layer comprises high density polyethylene and the other comprises linear low density polyethylene.*

*55. The slipsheet or divider sheet according to claim 44, wherein the sheet of material has a thickness of from 1 millimeter to 5 millimeters.*

*56. The slipsheet or divider sheet according to claim 44, wherein the sheet of material is made from recyclable material.*

*57. The slipsheet or divider sheet according to claim 44, wherein the sheet of material is recyclable.*

*58. The slipsheet or divider sheet according to claim 44, wherein the sheet of material is rectangular.*

*59. The slipsheet or divider sheet according to claim 44, wherein the four edges can be gripped by a push pull device.*

* * * * *